(12) United States Patent
Watanabe et al.

(10) Patent No.: US 9,202,484 B1
(45) Date of Patent: Dec. 1, 2015

(54) MAGNETIC HEAD PROVIDED SPIN TORQUE OSCILLATOR WITH LOW DRIVE VOLTAGE FOR MICROWAVE ASSISTED MAGNETIC RECORDING

(71) Applicant: HGST Netherlands B.V., Amsterdam (NL)

(72) Inventors: Katsuro Watanabe, Ibaraki (JP); Kenji Sugiura, Kanagawa (JP); Yuta Udo, Kanagawa (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/593,801

(22) Filed: Jan. 9, 2015

(51) Int. Cl.
*G11B 5/39* (2006.01)

(52) U.S. Cl.
CPC .................... *G11B 5/39* (2013.01)

(58) Field of Classification Search
CPC ............ G11B 5/1278; G11B 2005/0024; G11B 5/3116; G11B 5/314; G11B 5/3146
USPC ........................................ 360/125.3
See application file for complete search history.

(56) References Cited

U.S. PATENT DOCUMENTS

| | | | |
|---|---|---|---|
| 8,208,219 B2 | 6/2012 | Zhang et al. | |
| 8,274,811 B2 | 9/2012 | Zhang et al. | |
| 8,305,711 B2 | 11/2012 | Li et al. | |
| 8,472,135 B1 | 6/2013 | Kusukawa et al. | |
| 8,520,338 B2 * | 8/2013 | Udo et al. | 360/128 |
| 8,537,497 B2 | 9/2013 | Nagasaka et al. | |
| 8,614,861 B1 * | 12/2013 | Tomoda et al. | 360/125.3 |
| 8,730,616 B2 * | 5/2014 | Yamada et al. | 360/125.3 |
| 8,780,500 B2 | 7/2014 | Shirotori et al. | |
| 2014/0104724 A1 * | 4/2014 | Shiroishi et al. | 360/75 |
| 2014/0177092 A1 | 6/2014 | Katada et al. | |

OTHER PUBLICATIONS

U.S. Appl. No. 14/254,823, filed Apr. 16, 2014.

* cited by examiner

*Primary Examiner* — Mark Blouin
(74) *Attorney, Agent, or Firm* — Patterson & Sheridan, LLP

(57) ABSTRACT

Embodiments disclosed herein generally relate to a MAMR head. The MAMR head includes an STO. The STO has a first surface at a media facing surface, and a portion of the first surface has a trapezoidal shape. Having this configuration, the acute angles of the trapezoidal shaped portion provide a greater width of the STO at the media facing surface, which protect the main pole from over-etching during the fabrication of the STO. In addition, the acute angles of the trapezoidal shaped portion of the first surface are large enough to keep a low STO driving voltage and provide the MAMR head with a long operation lifetime and higher reliability.

19 Claims, 9 Drawing Sheets

MAGNETIC HEAD PROVIDED SPIN TORQUE OSCILLATOR WITH LOW DRIVE VOLTAGE FOR MICROWAVE ASSISTED MAGNETIC RECORDING

BACKGROUND

1. Field

Embodiments disclosed herein generally relate to a magnetic disk device employing a microwave assisted magnetic recording (MAMR) head.

2. Description of the Related Art

Over the past few years, MAMR has been studied as a recording method to improve the areal density of a magnetic read/write device, such as a hard disk drive (HDD). MAMR enabled magnetic recording heads utilize a spin torque oscillator (STO) for generating a microwave (high frequency AC magnetic field). When the magnetic field from the write head is applied and current is conducted to the STO, the STO oscillates and may provide an AC magnetic field to the media. The AC magnetic field may reduce the coercive force of the recording media, thus high quality recording by MAMR may be achieved. Typically the STO includes a spin polarization layer (SPL) for transmitting the spin polarized torque, a field generation layer (FGL) for generating the AC magnetic field, and an interlayer disposed between the SPL and the FGL.

In order to achieve higher areal density and a longer operation lifetime, an improved STO structure is needed.

SUMMARY

Embodiments disclosed herein generally relate to a MAMR head. The MAMR head includes an STO. The STO has a first surface at a media facing surface, and a portion of the first surface has a trapezoidal shape. Having this configuration, the acute angles of the trapezoidal shaped portion provide a greater width of the STO at the media facing surface, which protect the main pole from over-etching during the fabrication of the STO. In addition, the acute angles of the trapezoidal shaped portion of the first surface are large enough to keep a low STO driving voltage and provide the MAMR head with a long operation lifetime and higher reliability.

In one embodiment, a MAMR head includes a main pole and an STO. The STO includes a first surface at a media facing surface, the first surface has a first portion adjacent the main pole, and the first portion has a trapezoidal shape.

In another embodiment, a MAMR head includes a main pole and an STO. The STO includes a first surface at a media facing surface, a second surface adjacent the first surface, and the second surface is disposed on the main pole. The STO further includes a third surface adjacent the first surface, and the second surface and the third surface form a first acute angle. The STO further includes a fourth surface adjacent the first surface, and the second surface and the fourth surface form a second acute angle.

In another embodiment, a HDD includes a magnetic media, a magnetic read head, and a magnetic write head. The magnetic read head and the magnetic write head include a media facing surface, and the magnetic write head further includes an STO. The STO has a first surface at a media facing surface, the first surface has a first portion adjacent the main pole, and the first portion has a trapezoidal shape.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to a MAMR head. The MAMR head includes an STO. The STO has a first surface at a media facing surface, and a portion of the first surface has a trapezoidal shape. Having this configuration, the acute angles of the trapezoidal shaped portion provide a greater width of the STO at the media facing surface, which protect the main pole from over-etching during the fabrication of the STO. In addition, the acute angles of the trapezoidal shaped portion of the first surface are large enough to keep a low STO driving voltage and provide the MAMR head with a long operation lifetime and higher reliability.

Figure 1:
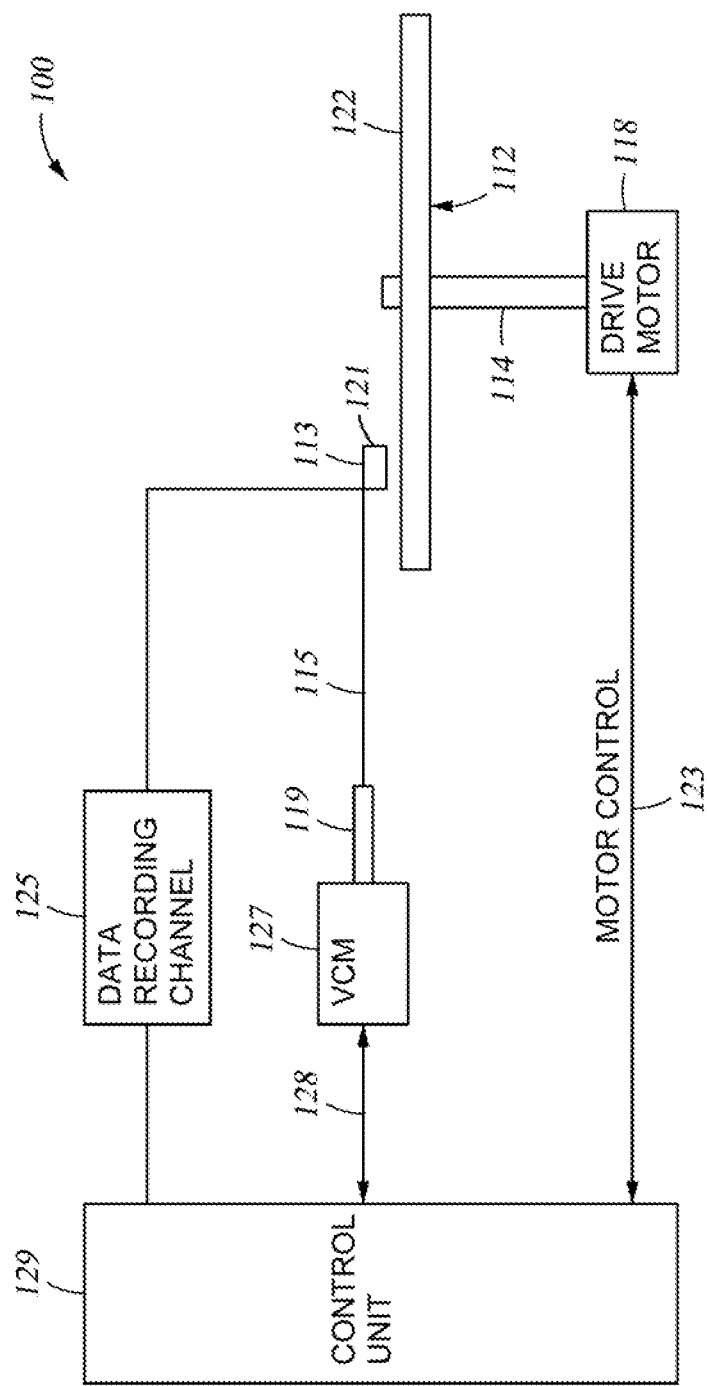
FIG. 1 illustrates a disk drive system, according to embodiments described herein.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121 that may include an STO for applying an AC magnetic field to the media surface 122. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the MAMR enabled disk drive 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 off and slightly above the media 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the media 112.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2A:
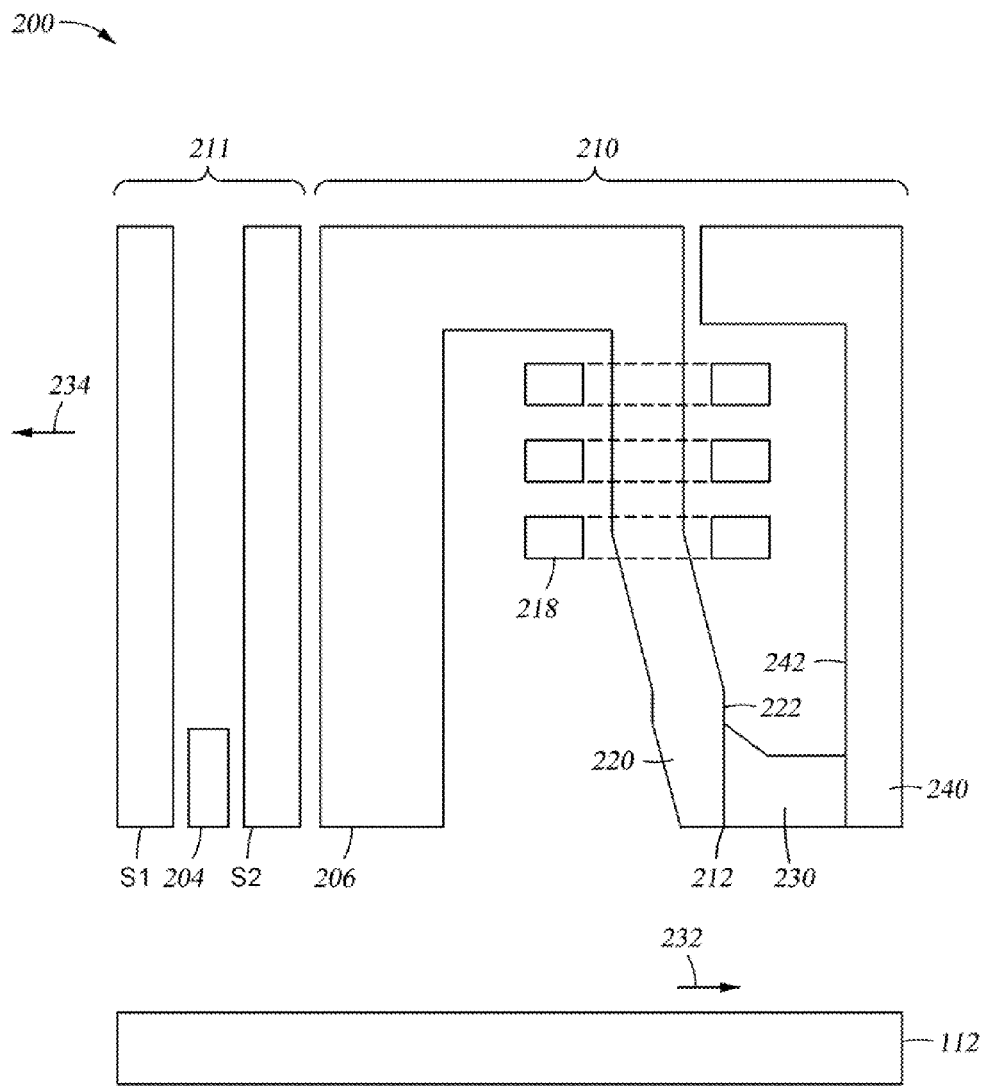
FIG. 2A is a fragmented, cross sectional side view of a MAMR read/write head and magnetic media of the disk drive system of FIG. 1, according to one embodiment described herein.

FIG. 2A is a fragmented, cross sectional side view through the center of a MAMR read/write head 200 facing the magnetic media 112. The read/write head 200 may correspond to the magnetic head assembly 121 described in FIG. 1. The read/write head 200 includes a media facing surface (MFS) 212, such as an air bearing surface (ABS), a magnetic write head 210 and a magnetic read head 211, and is mounted such that the MFS 212 is facing the magnetic media 112. In FIG. 2A, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, an STO 230 disposed between the main pole 220 and the trailing shield 240, and a coil 218 that excites the main pole 220. The coil 218 may have a "pancake" structure which winds around a back-contact between the main pole 220 and the return pole 206, instead of a "helical" structure shown in FIG. 2A. A trailing gap (not shown) and a leading gap (not shown) may be in contact with the main pole and a leading shield (not shown) may be in contact with the leading gap. The trailing and leading gaps and the leading shield are described in detail in FIG. 2B. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222 which may be parallel to a leading surface 242 of the trailing shield 240, and the STO 230 may be coupled to the trailing surface 222 of the main pole 220 and the leading surface 242 of the trailing shield 240. The main pole 220 may be a tapered write pole (TWP) with a trailing edge taper (TET) configuration. The TWP main pole 220 is described in detail in FIGS. 5B-5C. In one embodiment, the main pole 220 has a saturated magnetization (Ms) of 2.4 T and a thickness of about 300 nanometers (nm). The trailing shield 240 may be a magnetic material such as NiFe alloy. In one embodiment, the trailing shield 240 has an Ms of about 1.2 T.

Figure 2B:
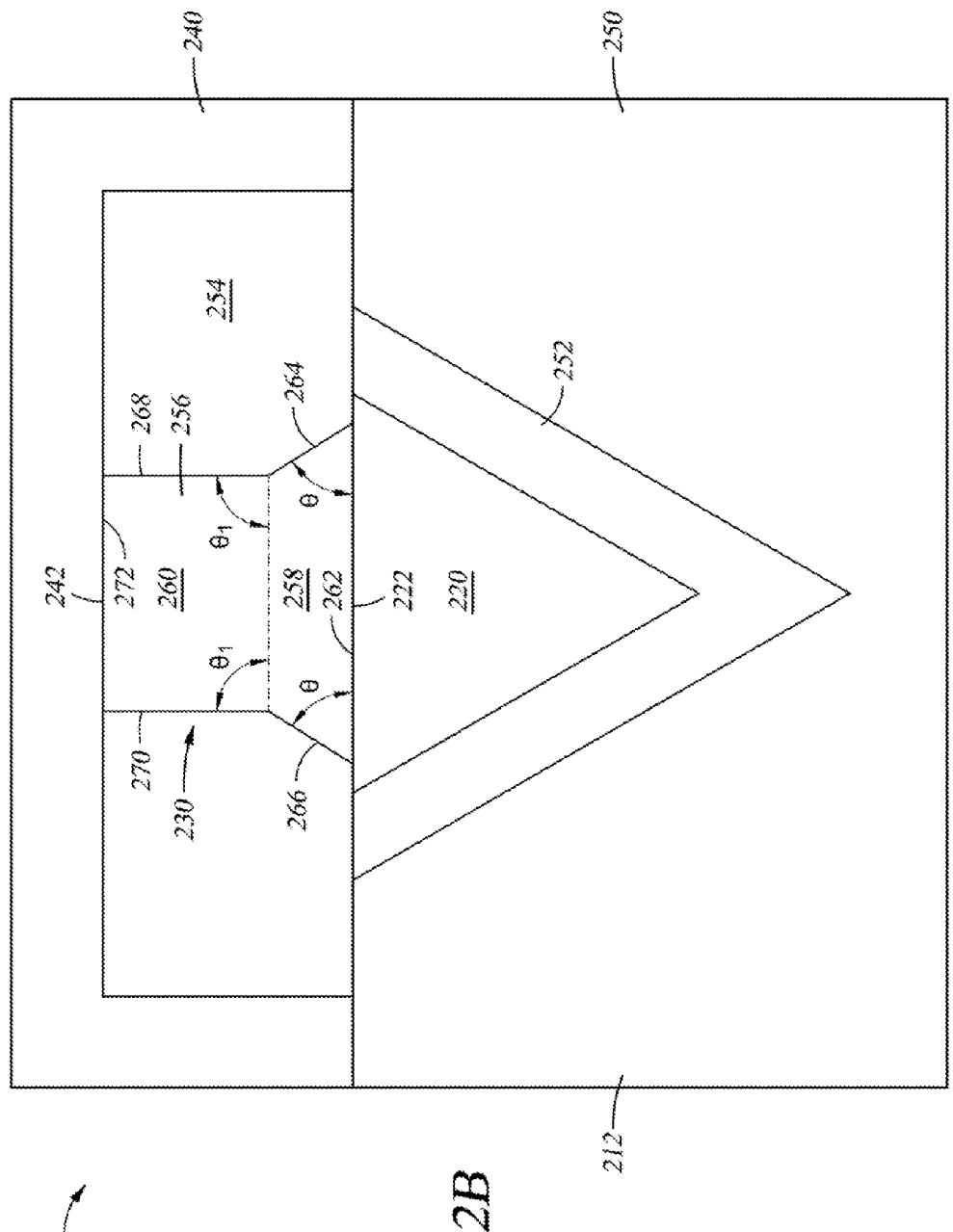
FIG. 2B is a fragmented, media facing surface view of a MAMR write head of the MAMR read/write head of FIG. 2A, according to one embodiment described herein.

FIG. 2B is a fragmented, MFS view of the write head 210 according to one embodiment. Viewed from the MFS 212, the STO 230 may be disposed on the trailing surface 222 of the main pole 220 and may be surrounded by a trailing gap 254. The trailing shield 240 may be disposed on the STO 230 and the trailing gap 254, and the trailing shield 240 may surround the trailing gap 254. The leading surface 242 of the trailing shield 240 may be in contact with the STO 230. The main pole 220 may be in contact with a leading gap 252, which may be in contact with a leading shield 250.

The STO 230 may include a surface 256 at the MFS 212, and the surface 256 may include a first portion 258 and a second portion 260. The first portion 258 of the surface 256 may be adjacent the main pole 220 and the second portion 260 of the surface 256 may be adjacent the trailing shield 240. In one embodiment, the first portion 258 of the surface 256 is disposed on the trailing surface 222 of the main pole 220 and the leading surface 242 of the trailing shield 240 is disposed on the second portion 260 of the surface 256. The first portion 258 may have a trapezoidal shape, as shown in FIG. 2B, and the trapezoidal shaped first portion 258 may include two acute angles θ. The acute angles θ may be greater than about 38 degrees, such as between about 38 degrees and about 85 degrees. The angles θ may be formed between a surface 262 and a surface 264 or 266. The angle formed between the surface 262 and the surface 264 may not be the same as the angle formed between the surface 262 and the surface 266. The surface 262 may be substantially parallel to the slider 113 described in FIG. 1. The surface 262 may be disposed on and in contact with the trailing surface 222 of the main pole 220 and adjacent the first portion 258 of the surface 256. The surface 264 or 266 may be adjacent the first portion 258 of the surface 256. The STO 230 may further include a surface 268, a surface 270, and a surface 272. The surface 268 or 270 may form an angle $\theta_1$ with respect to the surface 262, and the angle $\theta_1$ is greater than the angle θ. In one embodiment, the angle $\theta_1$ is about 90 degrees and the surfaces 268 and 270 are substantially parallel to each other. The second portion 260 of the surface 256 may have a rectangular shape. Alternatively, the angle $\theta_1$ is less than 90 degrees and the surfaces 268 and 270 are not substantially parallel to each other. The surface 272 may be in contact with the leading surface 242 of the trailing shield 240. The surfaces 268, 270, 272 may be all adjacent the second portion 260 of the surface 256. The surface 268 may be connected to the surface 264, and the surface 270 may be connected to the surface 266. The surfaces 264, 266, 268, 270 may each have a linear profile when viewed from the MFS 212. Alternatively, the surfaces 264, 266, 268, 270 may each have a curved profile, such as a concave profile, when viewed from the MFS 212.

Figure 3A:
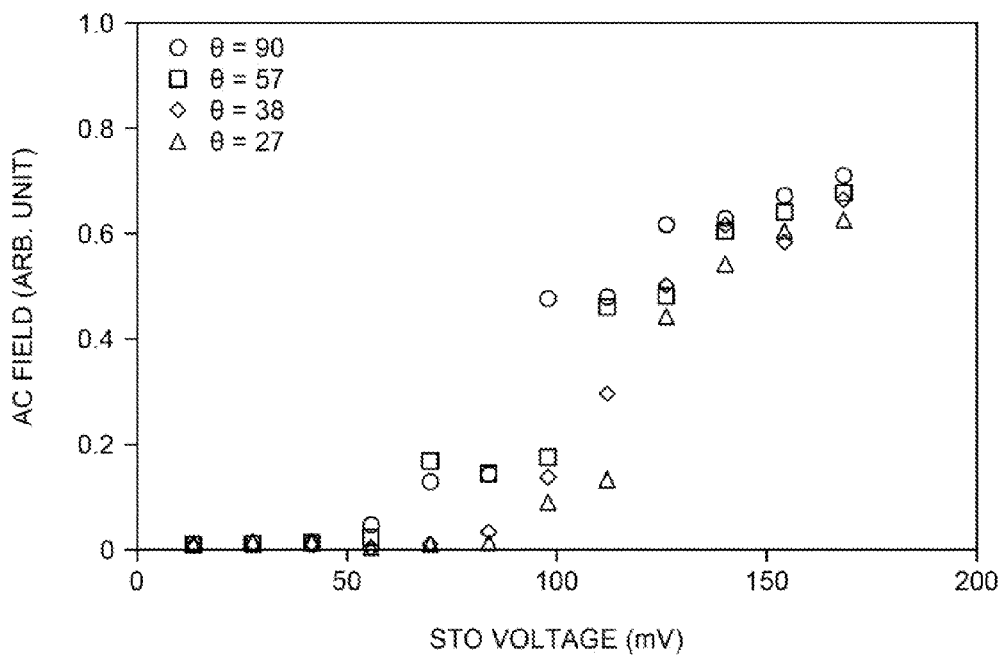
FIGS. 3A and 3B are charts showing the effect of various angles for the angle θ.
Figure 3B:
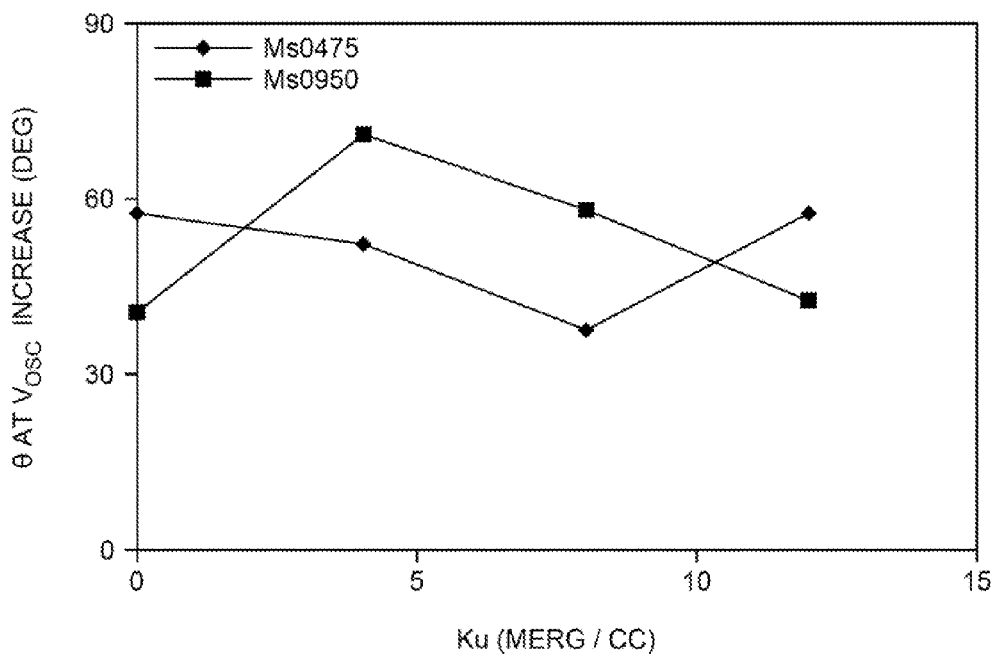

FIGS. 3A and 3B are charts showing the effect of various degrees for the angle $\theta$. FIG. 3A illustrates a relationship between AC field and STO voltage for angle $\theta$ at various degrees. As shown in FIG. 3A, the AC field increases at a lower STO voltage for higher $\theta$ angles, and a lower STO driving voltage leads to an STO having a longer operation lifetime and higher reliability. When the angle $\theta$ is 90 degrees, the AC field increases the most at the lowest STO voltage compared to angles that are less than 90 degrees. However, when the angle $\theta$ is 90 degrees, the main pole 220 may be over-etched during the fabrication of the STO 230 on the main pole 220, leading to degradation in write-ability of the MAMR write head 210. In order to reduce the over-etching of the main pole 220 during the fabrication of the STO 230, the angle $\theta$ may be less than 90 degrees. Thus, it is desirable for the angle $\theta$ to be an acute angle that is less than 90 degrees. FIG. 3B illustrates a relationship between the angle $\theta$ at AC field onset voltage ($V_{osc}$ increase) and perpendicular magnetic anisotropy constant $K_u$ of an SPL which is the first portion 258 of the STO 230 shown in FIG. 2B. As shown in FIG. 3B, when an SPL has the low saturation magnetization Ms without remarkable degradation in spin polarization, the minimum angle for the angle $\theta$ for starting oscillation is about 38 degrees. Therefore, the angle $\theta$ between about 38 degrees and 90 degrees is favorable. In addition, in one example of the STO 230, an SPL and an FGL begin oscillating as the spin transfer torque effect from the SPL and FGL acts upon each other. Typically the SPL has a smaller product of saturation magnetization Ms and thickness t (Ms×t) and should begin oscillating first at a lower STO driving voltage. However, if the trapezoidal shaped first portion 258 is an SPL and a portion of the second portion 260 is an FGL, the width of a portion of the SPL at the MFS 212 is greater than the width of the FGL at the MFS 212. Wider SPL, i.e., smaller angle $\theta$, increases STO driving voltage because of the protruding portions of the SPL that are not receiving the spin transfer torque effect from the FGL. If the angle $\theta$ is less than about 38 degrees, the STO driving voltage would be too high, which deteriorates the operation lifetime of the MAMR head. Thus, the angle $\theta$ may be greater than about 38 degrees, such as between about 38 degrees and about 85 degrees.

Figure 4A:
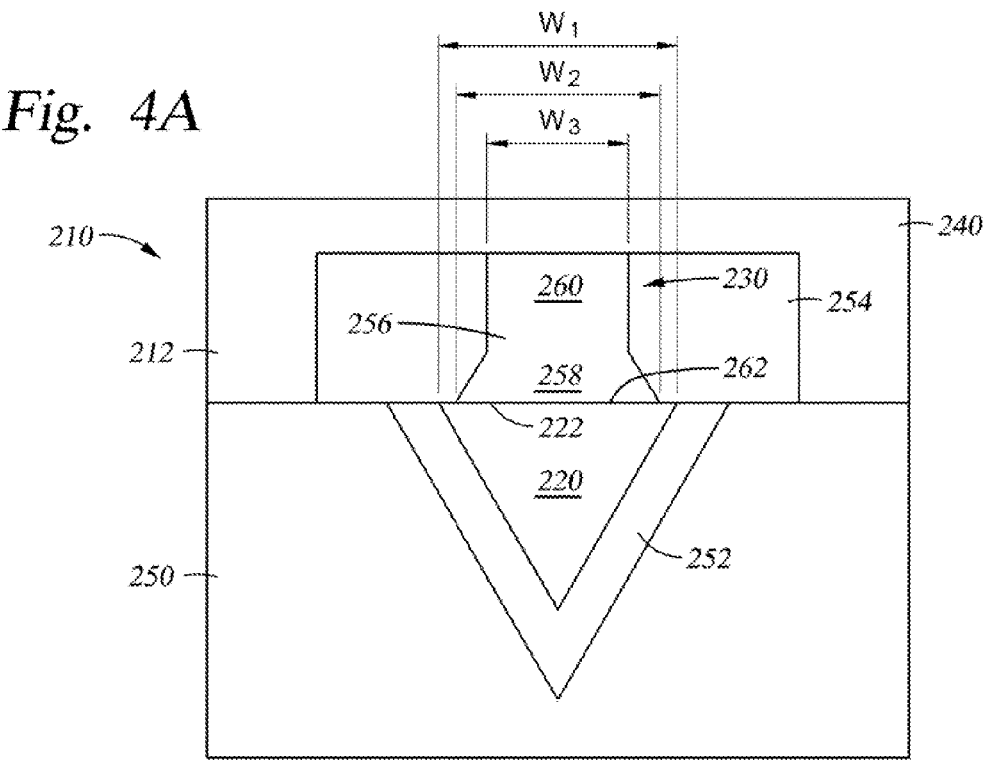
FIGS. 4A-4C are fragmented, media facing surface views of the MAMR write head of FIG. 2B, according to various embodiments.
Figure 4B:
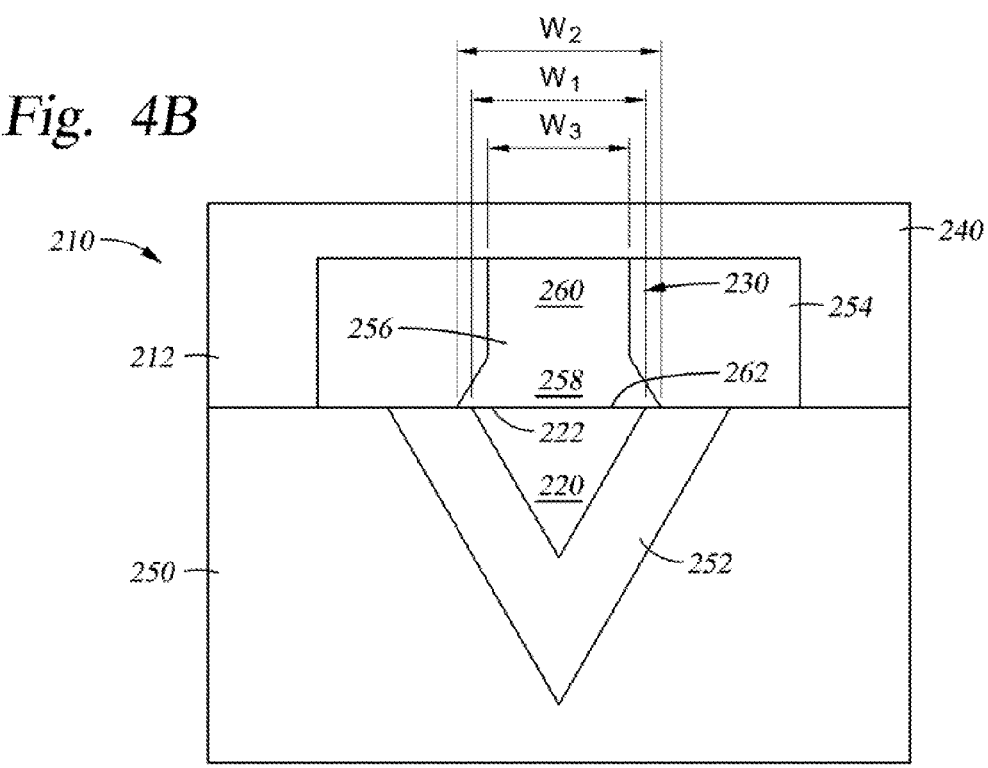
Figure 4C:
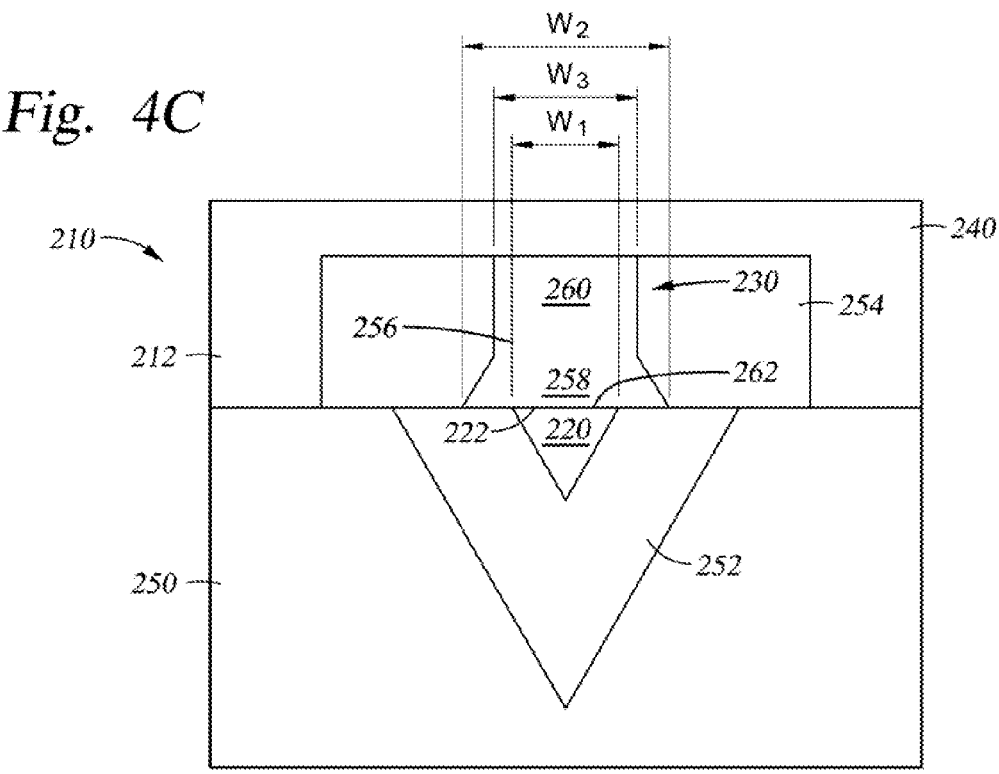

FIGS. 4A-4C are fragmented, MFS views of the write head 210 according to various embodiments. As shown in FIG. 4A, the trailing surface 222 of the main pole 220 has a width $W_1$ at the MFS 212, the surface 262 of the STO 230, or the base of the trapezoidal shaped first portion 258 of the surface 256, has a width $W_2$ at the MFS 212, and the second portion 260 of the surface 256 of the STO 230, or the top of the trapezoidal shaped first portion 258, has a width $W_3$ at the MFS 212. The width $W_1$ may be greater than the width $W_2$, which may be greater than the width $W_3$. In this configuration, because the width $W_1$ of the main pole 220 is greater than the width $W_3$ of the STO 230, there is no risk of applying non-uniform magnetic field from the main pole 220 to the STO 230. The risk of over-etching the main pole 220 may be minimized by optimizing the etching process of the STO 230. The optimized etching process of the STO 230 may include a shorter etch time, and a thicker resist mask as well for the STO 230 on the main pole 220 with TET, which lead to the trapezoidal shaped first portion 258 of the surface 256 adjacent the main pole 220. As the etch time is reduced, the portion of the STO 230 having the width greater than $W_3$ is not removed by the etching process, protecting the main pole 220 disposed therebelow. The main pole 220 is not over-etched as a result of the trapezoidal shaped first portion 258, leading to minimizing degradation of the write-ability of the MAMR write head 210 and achieving higher areal density.

In another embodiment, as shown in FIG. 4B, the width $W_1$ is smaller than the width $W_2$ and greater than the width $W_3$. In this configuration, there is no risk of applying non-uniform magnetic field from the main pole 220 to the STO 230 since the width $W_1$ of the main pole 220 is again greater than the width $W_3$ of the STO 230. There is also no risk of over-etching the main pole 220 since the width $W_2$ of the STO 230 is greater than the width $W_1$ of the main pole 220. In another embodiment, as shown in FIG. 4C, the width $W_1$ is smaller than the width $W_3$, which is smaller than the width $W_2$. In this configuration, there is no risk of over-etching the main pole 220 since the width $W_1$ of the main pole 220 is smaller than the width $W_2$ of the STO 230. However, there is a risk of applying non-uniform magnetic field from the main pole 220 to the STO 230 since the width $W_1$ of the main pole 220 is smaller than the width $W_3$ of the STO 230. Thus, in order to eliminate or reduce both the risks of applying non-uniform magnetic field from the main pole 220 to the STO 230 and over-etching the main pole 220, the width $W_1$ of the main pole 220 should be greater than the width $W_3$ of the STO 230. The width $W_1$ of the main pole 220 may be greater or smaller than the width $W_2$ of the STO 230.

Figure 5A:
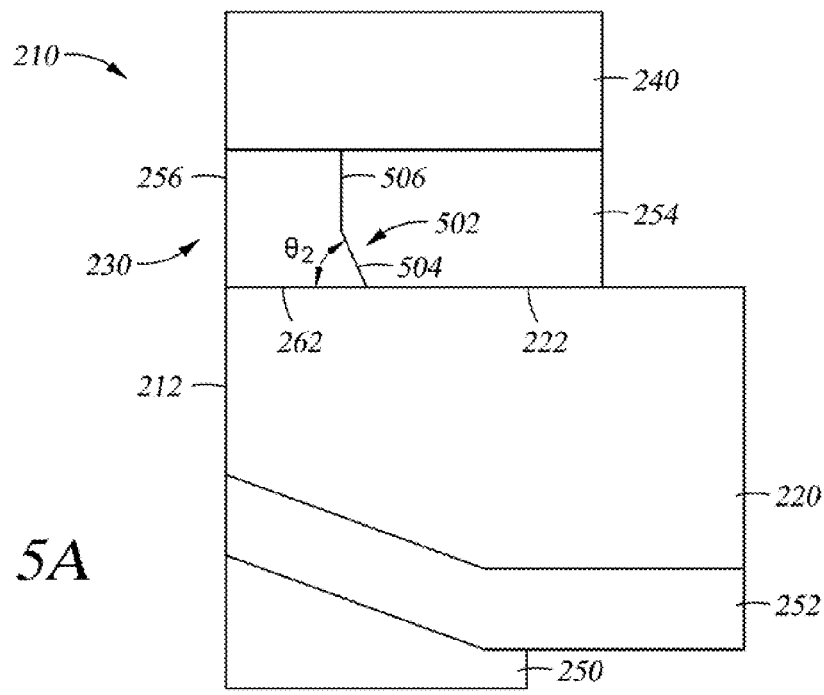
FIGS. 5A-5C are fragmented, cross sectional side views of the MAMR write head of FIG. 2B, according to various embodiments described herein.
Figure 5B:
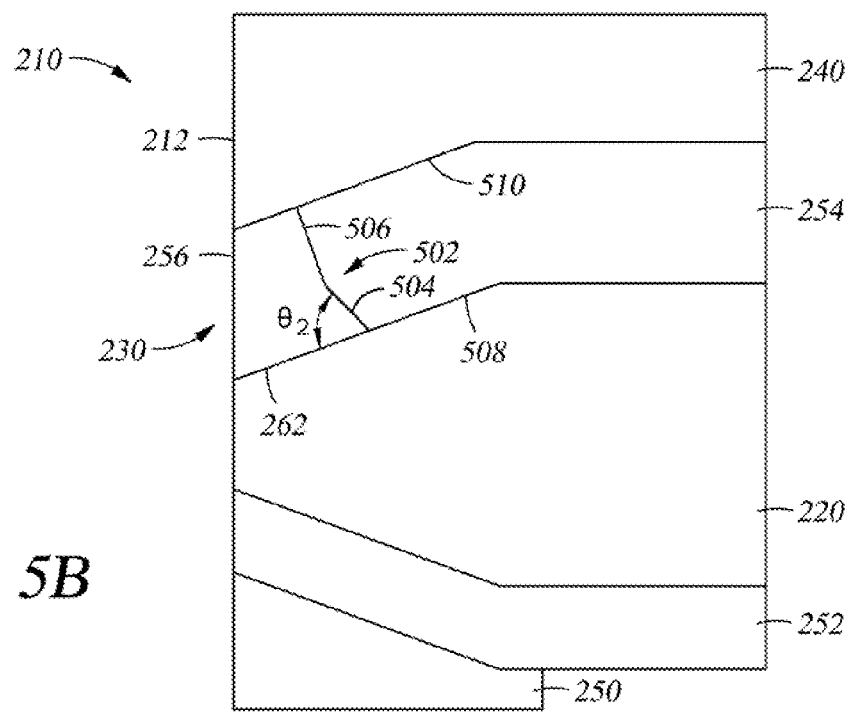
Figure 5C:
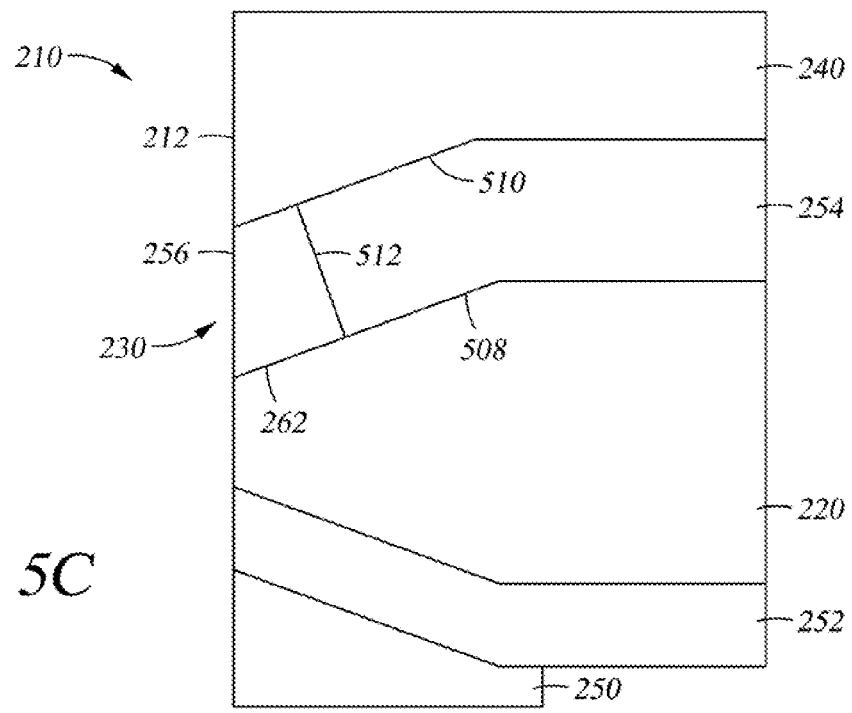

FIGS. 5A-5C are fragmented, cross sectional side views of the write head 210 according to various embodiments. As shown in FIG. 5A, the STO 230 includes the surface 256 at the MFS 212 and a surface 502 opposite the surface 256. The surface 502 may include a first portion 504 and a second portion 506. The first portion 504 and the second portion 506 may not be coplanar. The first portion 504 of the surface 502 may correspond to the first portion 258 of the surface 256 described in FIG. 2B and may form an acute angle $\theta_2$ with the surface 262. The angle $\theta_2$ may be any suitable acute angle. However, the acute angle $\theta_2$ may not be the same as the acute angles $\theta$ described in FIG. 2B. The second portion 506 of the surface 502 may be substantially perpendicular to the surface 262.

FIG. 5B shows a TWP main pole 220 having a TET according to one embodiment. Instead of having the trailing surface 222 that is substantially perpendicular to the MFS 212, the TWP main pole 220 includes a tapered trailing surface 508 that is not substantially perpendicular to the MFS 212. The trailing shield 240 may include a tapered leading surface 510 that is substantially parallel to the tapered trailing surface 508. The STO 230 may be coupled to the tapered trailing surface 508 of the main pole 220 and the tapered leading surface 510 of the trailing shield 240. The surface 262 of the STO 230 may be disposed on and in contact with the tapered trailing surface 508. Again the STO 230 may include the surface 502 that is opposite the surface 256, and the surface 502 includes the first portion 504 and the second portion 506. The first portion 504 of the surface 502 may form the acute angle $\theta_2$ with the surface 262.

FIG. 5C shows the TWP main pole 220 having the TET according to another embodiment. As shown in FIG. 5C, the STO 230 may include a surface 512 that is opposite the surface 256, and the surface 512 may be planar. The surface 512 may be substantially perpendicular to the surface 262. The surface 512 may be also substantially perpendicular to the tapered trailing surface 508 and the tapered leading surface 510. Surfaces 504, 506, 512 may each have a linear profile when viewed from the side as shown in FIGS. 5A-5C. Alternatively, surfaces 504, 506, 512 may each have a curved profile, such as a concave profile, when viewed from the side.

Figure 6A:
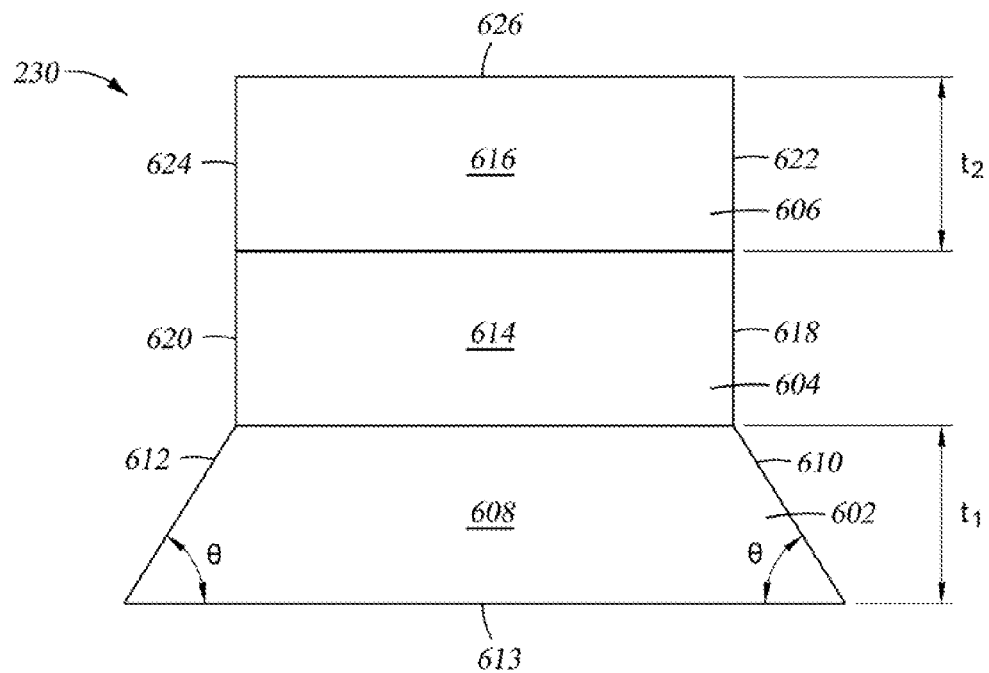
FIGS. 6A-6D are media facing surface views of an STO, according to various embodiments.

FIGS. 6A-6D are MFS views of the STO 230 according to various embodiments. As shown in FIG. 6A, the STO 230 may include a first layer 602, a second layer 604 and a third layer 606. The first layer 602 may be an SPL, the second layer 604 may be an interlayer, and the third layer 606 may be an FGL. The first and third layers 602, 606 may be made of a magnetic material such as cobalt and/or nickel containing material. The second layer 604 may be made of a nonmagnetic metal, such as copper. The first layer 602 may include a surface 608 at the MFS 212, and the surface 608 may be the first portion 258 of the surface 256 described in FIG. 2B. The first layer 602 may further include a surface 610, a surface 612 and a surface 613. The surfaces 610, 612, 613 may be the surfaces 264, 266, 262 described in FIG. 2B, respectively. The angles θ may be formed between the surface 613 and the surface 612 or 610. Again the angles θ may be between about 38 degrees and about 85 degrees.

The second layer 604 may include a surface 614 at the MFS 212, a surface 618 and a surface 620. The third layer 606 may include a surface 616 at the MFS 212, a surface 622, a surface 624 and a surface 626. The surfaces 614, 616 together may be the second portion 260 of the surface 256 described in FIG. 2B. The surfaces 618, 622 together may be the surface 268 described in FIG. 2B. The surfaces 620, 624 together may be the surface 270 described in FIG. 2B. The surface 626 may be the surface 272 described in FIG. 2B. In one embodiment, the first layer 602 is an SPL and the third layer 606 is an FGL, and the product of saturation magnetization Ms and a thickness $t_1$ (Ms×$t_1$) of the SPL is greater than the product of saturation magnetization Ms and a thickness $t_2$ (Ms×$t_2$) of the FGL. The SPL may not have particular magnetic anisotropy or perpendicular magnetic anisotropy to SPL layer plane. In another embodiment, the first layer 602 is an FGL, the second layer 604 is an interlayer, and the third layer 606 is an SPL.

Figure 6B:
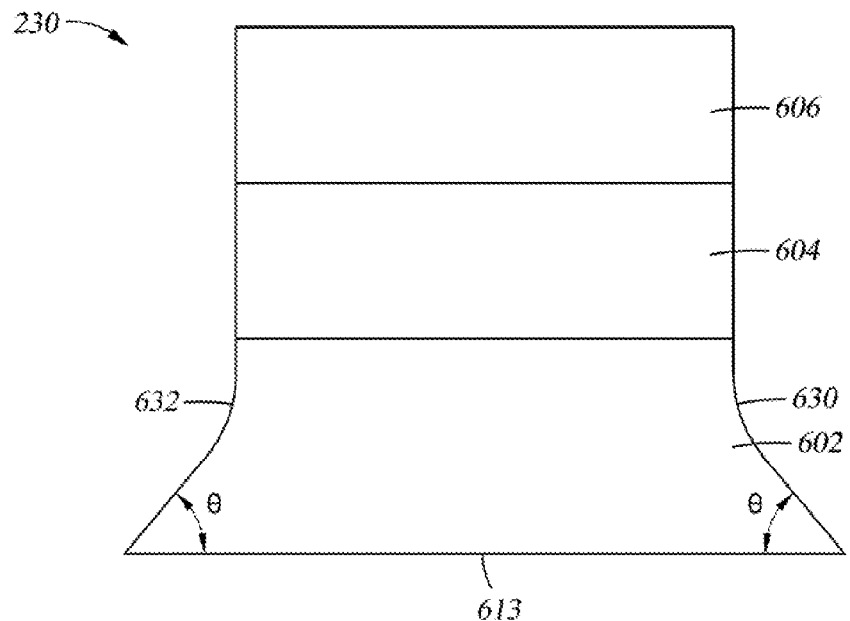

FIG. 6B is a MFS view of the STO 230 according to another embodiment. As shown in FIG. 6B, the STO 230 may include the first layer 602, the second layer 604 and the third layer 606. Unlike the surfaces 610, 612 each having a linear dimension at the MFS 212, the first layer 602 may include surfaces 630, 632 each having a curved dimension at the MFS 212. Again the angles θ may be formed between the surface 613 and the surface 630 or 632.

Figure 6C:
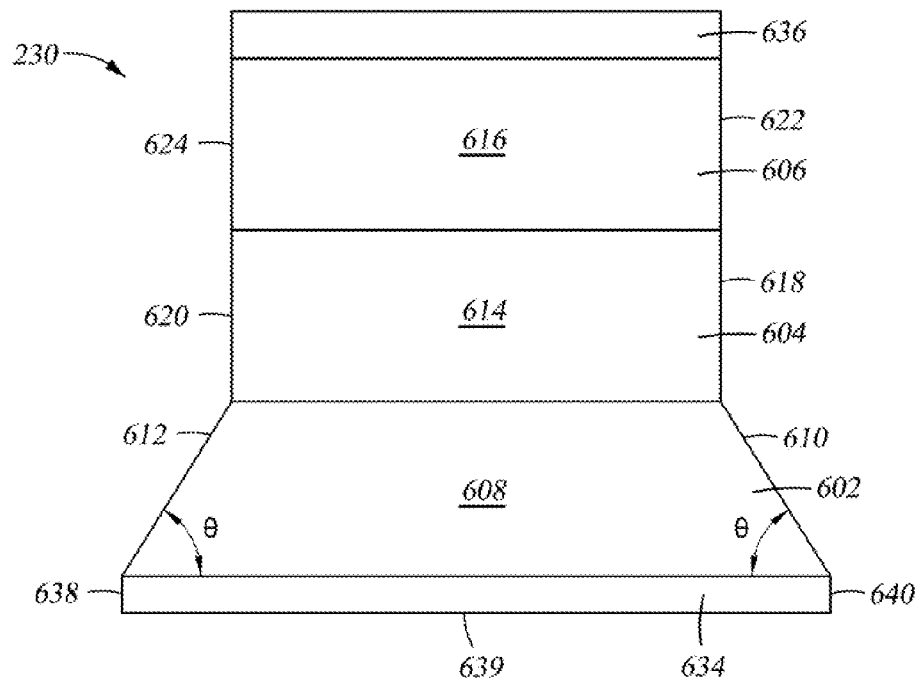

FIG. 6C is a MFS view of the STO 230 according to another embodiment. As shown in FIG. 6C, the STO may include a seed layer 634 and a capping layer 636. The first layer 602 may be disposed on the seed layer 634, and the seed layer 634 may be disposed on the main pole 220 such that a surface 639 of the seed layer 634 may be in contact with the main pole 220. The capping layer 636 may be disposed on the third layer 606, and the trailing shield 240 may be disposed on the capping layer 636. The seed layer 634 may include surfaces 638, 640 that may be substantially perpendicular to the surface 639. Alternatively, the surface 638 may be coplanar with the surface 612 of the first layer 602, and the surface 640 may be coplanar with the surface 610 of the first layer 602.

Figure 6D:
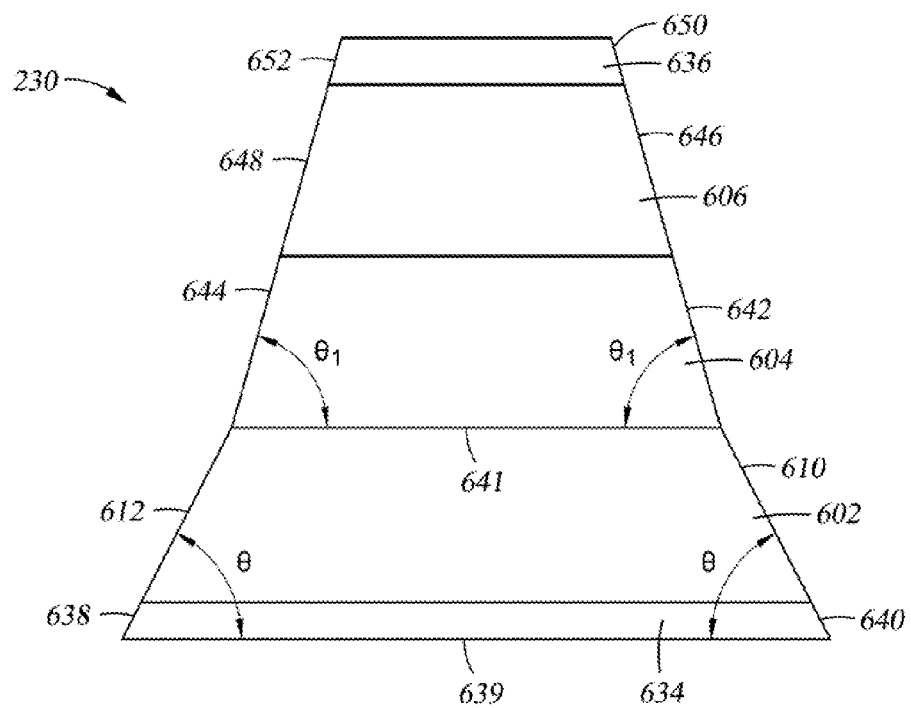

FIG. 6D is a MFS view of the STO 230 according to another embodiment. As shown in FIG. 6D, the first layer 602 may include surfaces 610, 612, which are coplanar with surfaces 640, 638 of the seed layer 634, respectively. Thus, the angle θ may be formed between the surface 638 or 640 and the surface 639. The second layer 604 may include surfaces 642, 644, the third layer 606 may include surface 646, 648, and the capping layer 636 may include surfaces 650, 652. The surfaces 642, 646, 650 may be coplanar, the surfaces 644, 648, 652 may be coplanar, and the coplanar surface of the surfaces 642, 646, 650 may not be substantially parallel to the coplanar surface of the surfaces 644, 648, 652. The first layer 602 may further include a surface 641 that is substantially parallel to the surface 639, and the acute angle $θ_1$ may be formed between the surface 642 or 644 and the surface 641. Again the acute angle $θ_1$ may be greater than the angle θ.

In summary, a MAMR enabled magnetic head is disclosed. The MAMR head includes an STO disposed between a main pole and a trailing shield. The STO has a first surface at a media facing surface, and a portion of the first surface adjacent the main pole has a trapezoidal shape. Having this configuration, the main pole is not over-etched during fabrication, which reduces degradation in write-ability and increases areal density. In addition, the acute angles of the trapezoidal shaped portion of the first surface keep a low STO driving voltage and provide the MAMR head with a long operation lifetime and higher reliability.

While the foregoing is directed to embodiments of the disclosure, other and further embodiments may be devised without departing from the basic scope thereof, and the scope thereof is determined by the claims that follow.

What is claimed is:

1. A microwave assisted magnetic recording head, comprising:
   a main pole including a trailing surface; and
   a spin torque oscillator in contact with the trailing surface of the main pole, wherein the spin torque oscillator includes:
      a first surface at a media facing surface, wherein the first surface has a first portion adjacent the main pole, wherein the first portion has a trapezoidal shape, wherein the trailing surface of the main pole has a width at the media facing surface, and wherein the width of the trailing surface is smaller than a width of a base of the trapezoidal shaped first portion of the first surface of the spin torque oscillator at the media facing surface.

2. The microwave assisted magnetic recording head of claim 1, further including a trailing shield, wherein the spin torque oscillator is disposed between the main pole and the trailing shield.

3. The microwave assisted magnetic recording head of claim 2, wherein the first surface of the spin torque oscillator further includes a second portion, and wherein the second portion is disposed adjacent the trailing shield.

4. The microwave assisted magnetic recording head of claim 3, wherein the width of the trailing surface of the main pole is greater than a width of the second portion of the first surface of the spin torque oscillator at the media facing surface.

5. The microwave assisted magnetic recording head of claim 1, wherein the first portion includes two acute angles.

6. The microwave assisted magnetic recording head of claim 5, wherein the acute angles each is between about 38 degrees and about 85 degrees.

7. The microwave assisted magnetic recording head of claim 1, wherein the spin torque oscillator includes a spin polarization layer, a field generation layer, and an interlayer disposed between the spin polarization layer and the field generation layer.

8. The microwave assisted magnetic recording head of claim 7, wherein the spin polarization layer includes the first portion of the first surface of the spin torque oscillator.

9. The microwave assisted magnetic recording head of claim 7, wherein the field generation layer includes the first portion of the first surface of the spin torque oscillator.

10. A microwave assisted magnetic recording head, comprising:
a main pole; and
a spin torque oscillator, wherein the spin torque oscillator includes:
a first surface at a media facing surface; and
a second surface opposite the first surface, wherein the second surface includes a first portion and a second portion, and wherein the first and second portions of the second surface are not coplanar.

11. The microwave assisted magnetic recording head of claim 10, wherein the spin torque oscillator further includes a third surface adjacent the first surface, wherein the third surface is in contact with the main pole, and wherein the first portion of the second surface form an acute angle with the third surface.

12. The microwave assisted magnetic recording head of claim 11, wherein the second portion of the second surface is substantially perpendicular to the third surface.

13. The microwave assisted magnetic recording head of claim 10, wherein the spin torque oscillator includes a spin polarization layer, a field generation layer, and an interlayer disposed between the spin polarization layer and the field generation layer.

14. A hard disk drive, comprising:
a magnetic media;
a magnetic read head; and
a magnetic write head, wherein the magnetic read head and the magnetic write head include a media facing surface, and the magnetic write head further comprises:
a main pole having a trailing surface; and
a spin torque oscillator, wherein the spin torque oscillator comprises:
a first surface at the media facing surface, wherein the first surface has a first portion adjacent the main pole, wherein the first portion has a trapezoidal shape, wherein the trailing surface of the main pole has a width at the media facing surface, and wherein the width of the trailing surface is smaller than a width of a base of the trapezoidal shaped first portion of the first surface of the spin torque oscillator at the media facing surface.

15. The hard disk drive of claim 14, wherein the first portion includes two acute angles.

16. The hard disk drive of claim 15, wherein the acute angles each is between 38 degrees and 85 degrees.

17. The hard disk drive of claim 14, wherein the spin torque oscillator includes a spin polarization layer, a field generation layer, and an interlayer disposed between the spin polarization layer and the field generation layer.

18. The hard disk drive of claim 17, wherein the spin polarization layer includes the first portion of the first surface of the spin torque oscillator.

19. The hard disk drive of claim 17, wherein the field generation layer includes the first portion of the first surface of the spin torque oscillator.

* * * * *